(12) United States Patent
Cary et al.

(10) Patent No.: US 9,227,536 B1
(45) Date of Patent: Jan. 5, 2016

(54) CONVERTIBLE CAR SEAT AND STROLLER

(71) Applicants: Jim Cary, San Bruno, CA (US); Sheila Cary, San Bruno, CA (US)

(72) Inventors: Jim Cary, San Bruno, CA (US); Sheila Cary, San Bruno, CA (US)

( * ) Notice: Subject to any disclaimer, the term of this patent is extended or adjusted under 35 U.S.C. 154(b) by 0 days.

(21) Appl. No.: 14/736,670

(22) Filed: Jun. 11, 2015

(51) Int. Cl.
*B60N 2/28* (2006.01)
*B62B 7/12* (2006.01)
*B62B 9/12* (2006.01)

(52) U.S. Cl.
CPC ............ *B60N 2/2848* (2013.01); *B60N 2/2845* (2013.01); *B62B 7/12* (2013.01); *B62B 9/12* (2013.01)

(58) Field of Classification Search
CPC ...... B60N 2/2848; B60N 2/2845; B62B 7/12; B62B 9/12
USPC .................................................. 280/47.35, 30
See application file for complete search history.

(56) References Cited

U.S. PATENT DOCUMENTS

| | | | | |
|---|---|---|---|---|
| 2,461,609 A * | 2/1949 | Light | ........................ | A47D 1/06 280/11 |
| 5,104,134 A | 4/1992 | Cone | | |
| 5,318,311 A * | 6/1994 | Bofill | ................... | B60N 2/2848 280/30 |
| 5,398,951 A * | 3/1995 | Ryu | ..................... | B60N 2/2848 280/30 |
| 5,403,022 A * | 4/1995 | Snider | .................. | B60N 2/2848 280/30 |
| D358,058 S * | 5/1995 | Anthony | ...................... | D12/129 |
| 6,237,995 B1 * | 5/2001 | Dierickx | .............. | B60N 2/2848 280/648 |
| 7,090,291 B2 * | 8/2006 | Birchfield | ............ | B60N 2/2845 280/30 |
| 7,100,976 B1 * | 9/2006 | Desalve | ............... | A45C 13/385 297/129 |
| 7,600,766 B2 * | 10/2009 | Erskine | ................ | B60N 2/2806 280/47.17 |
| 8,544,941 B2 * | 10/2013 | Coote | .................. | B60N 2/2845 280/30 |
| 8,801,028 B2 * | 8/2014 | Mazar | .................. | B60N 2/2845 280/30 |
| 8,998,242 B2 * | 4/2015 | Wang | ........................ | B62B 7/06 280/30 |
| 2010/0019547 A1 * | 1/2010 | Gray | ..................... | B60N 2/2821 297/118 |
| 2012/0205947 A1 * | 8/2012 | Coote | .................. | B60N 2/2845 297/183.2 |
| 2013/0229033 A1 * | 9/2013 | Lee | ....................... | B60N 2/2887 297/130 |
| 2015/0076798 A1 * | 3/2015 | Mazar | .................. | B60N 2/2848 280/648 |

* cited by examiner

*Primary Examiner* — Brodie Follman
*Assistant Examiner* — Brian Cassidy
(74) *Attorney, Agent, or Firm* — Crossley Patent Law

(57) ABSTRACT

A convertible car seat and stroller including a car seat, a support member disposed within a base of the car seat, a pair of openings disposed within a bottom surface of the base of the car seat, a pair of middle supports, a plurality of a pair of wheels attached to the support member, an inverted U-shaped telescopic handle, a grip portion medially disposed around a perimeter of a middle portion of the handle, an activation control disposed on a top side of the grip portion, and a pair of handle adjustment controls. The plurality of a pair of wheels has a retracted position and an alternate extended position. The handle has an elongated position and an alternate abbreviated position.

4 Claims, 3 Drawing Sheets

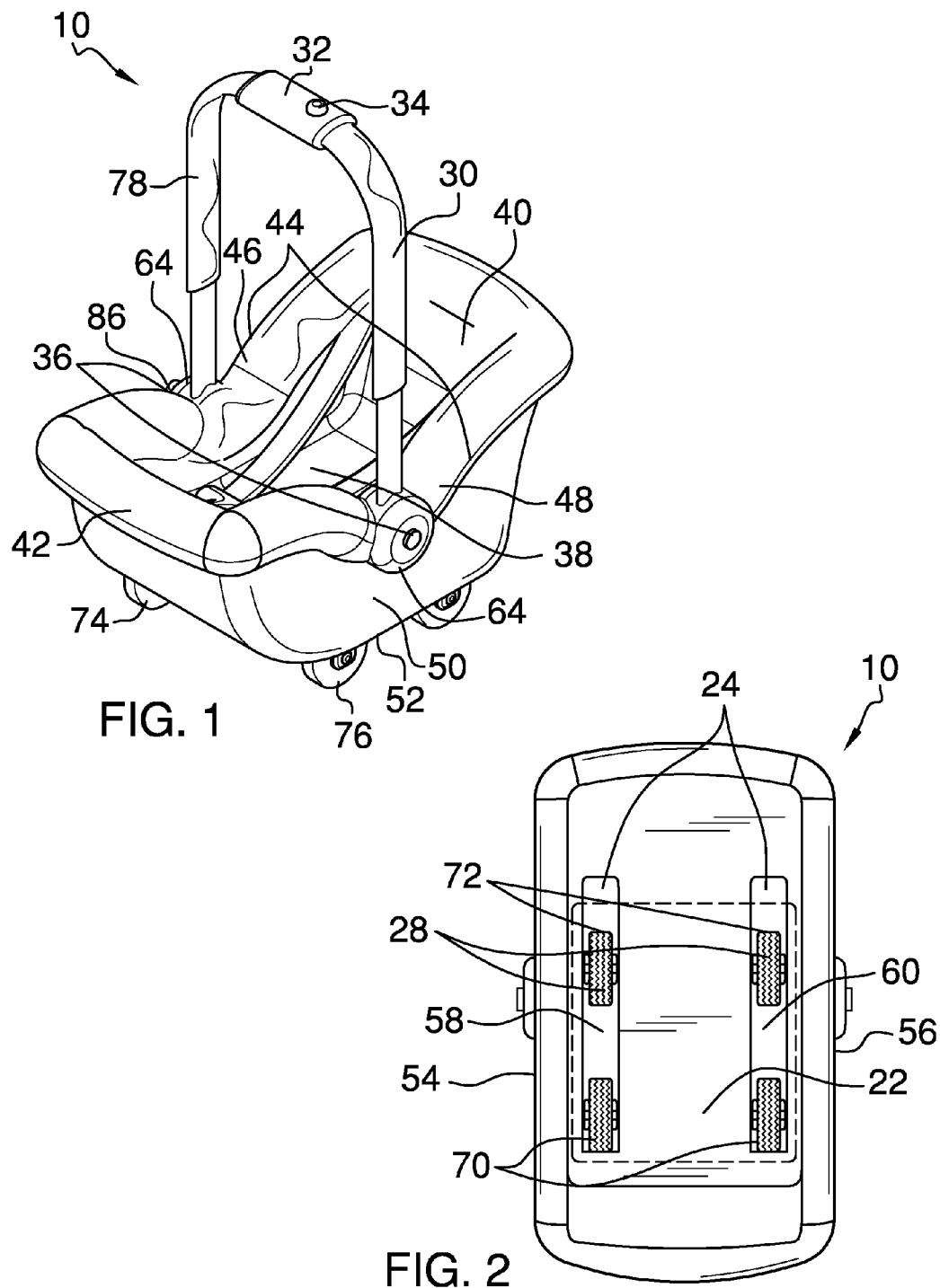

CONVERTIBLE CAR SEAT AND STROLLER

BACKGROUND OF THE INVENTION

Various types of strollers are known in the prior art. However, what has been needed is a convertible car seat and stroller including a car seat, a support member disposed within a base of the car seat, a pair of openings disposed within a bottom surface of the base of the car seat, a pair of middle supports, a plurality of a pair of wheels attached to the support member, an inverted U-shaped telescopic handle, a grip portion medially disposed around a perimeter of a middle portion of the handle, an activation control disposed on a top side of the grip portion, and a pair of handle adjustment controls. What has been further needed is for the plurality of a pair of wheels to have a retracted position and an alternate extended position and for the handle to have an elongated position and an alternate abbreviated position. Lastly, what has been needed is for the activation control to simultaneously transition the handle and the plurality of a pair of wheels between the elongated position and the extended position, respectively, and the abbreviated position and the retracted position, respectively. The convertible car seat and stroller thus eliminates the need to transfer an infant between a stroller and a car seat.

FIELD OF THE INVENTION

The present invention relates to strollers, and more particularly, to a convertible car seat and stroller.

SUMMARY OF THE INVENTION

The general purpose of the present convertible car seat and stroller, described subsequently in greater detail, is to provide a convertible car seat and stroller which has many novel features that result in a convertible car seat and stroller which is not anticipated, rendered obvious, suggested, or even implied by prior art, either alone or in combination thereof.

To accomplish this, the present convertible car seat and stroller includes a car seat, a support member, a pair of openings, a pair of middle supports, a plurality of a pair of wheels, an inverted U-shaped telescopic handle, a grip portion, an activation control, and a pair of handle adjustment controls. The car seat has a seat portion, a rearwardly inclined back portion, a front portion, a pair of V-shaped side portions comprising a right side portion and a left side portion, and a base having a bottom surface. The bottom surface of the base has a right side and a left side. The support member is disposed within the base. The pair of openings includes a right opening and a left opening. Each of the right opening and the left opening is disposed proximal the right side and the left side, respectively, on the bottom surface of the base, from proximal the back portion of the car seat to proximal the front portion of the car seat. The pair of middle supports includes a right middle support and a left middle support. Each of the right middle support and the left middle support has a top surface and a front surface. The right middle support and the left middle support are substantially medially disposed within the right side portion and the left side portion, respectively. Each of the right middle support and the left middle support is optionally substantially cylindrical.

The plurality of a pair of wheels includes a front pair of wheels and a rear pair of wheels. Each of the front pair of wheels and the rear pair of wheels has a right wheel colinearly disposed with a left wheel. The front pair of wheels and the rear pair of wheels are pivotally attached to the support member. The plurality of a pair of wheels has a retracted position and an alternate extended position. The plurality of a pair of wheels is in the retracted position when the right wheel of each of the front pair of wheels and the rear pair of wheels is fully disposed within the right opening, and the left wheel of each of the front pair of wheels and the rear pair of wheels is fully disposed within the left opening. The plurality of a pair of wheels is in the extended position when each of the front pair of wheels and the rear pair of wheels is fully disposed outside the base underneath the bottom surface of the base.

The inverted U-shaped telescopic handle has a right edge, a left edge, and a middle portion. Each of the right edge and the left edge is pivotally attached to the top surface of each of the right middle support and the left middle support, respectively. The handle has an elongated position and an alternate abbreviated position. The handle is in the elongated position when the handle is fully extended. The handle is in the abbreviated position when the handle is fully retracted. The grip portion is continuously medially disposed around a perimeter of the middle portion of the handle. The grip portion is optionally rubberized to ensure a better grip on the handle.

The activation control is disposed on a top side of the grip portion. The activation control is configured to simultaneously transition the handle and the plurality of a pair of wheels between the elongated position and the extended position, respectively, and the abbreviated position and the retracted position, respectively. The pair of handle adjustment controls includes a right handle adjustment control and a left handle adjustment control. Each of the right handle adjustment control and the left handle adjustment control is disposed on the front surface of each of the right middle support and the left middle support, respectively. Each of the right handle adjustment control and the left handle adjustment control is configured to pivotally rotate the handle toward the front portion of the car seat and, alternately, the back portion of the car seat.

Thus has been broadly outlined the more important features of the present convertible car seat and stroller so that the detailed description thereof that follows may be better understood and in order that the present contribution to the art may be better appreciated.

BRIEF DESCRIPTION OF THE DRAWINGS

Figures

FIG. 1 is a front isometric view.
FIG. 2 is a bottom plan view.

DETAILED DESCRIPTION OF THE DRAWINGS

Figure 3:
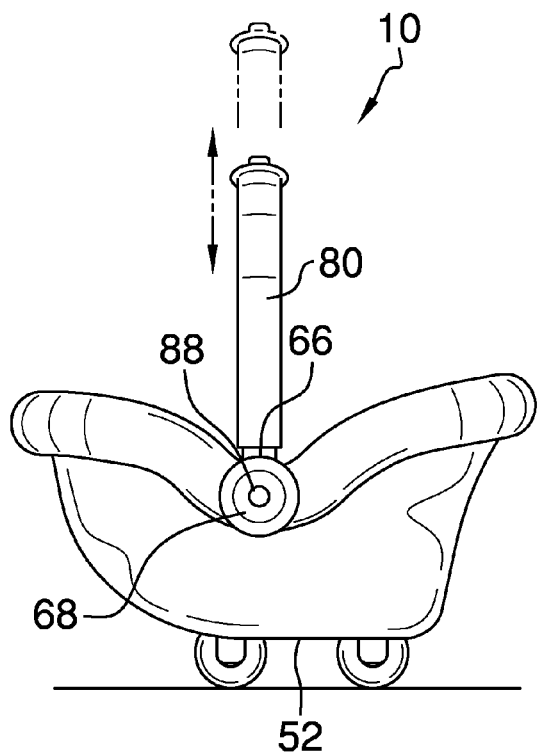
FIG. 3 is a side elevation view showing a telescopic handle.
Figure 4:
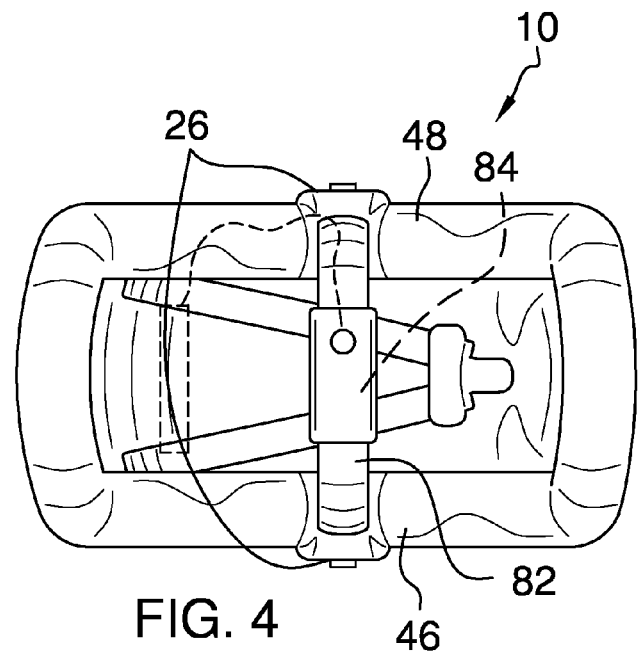
FIG. 4 is a top plan view.

With reference now to the drawings, and in particular FIGS. 1 through 5 thereof, an example of the instant convertible car seat and stroller employing the principles and concepts of the present convertible car seat and stroller and generally designated by the reference number 10 will be described.

Referring to FIGS. 1 through 5 the present convertible car seat and stroller 10 is illustrated. The convertible car seat and stroller 10 includes a car seat 20, a support member 22, a pair of openings 24, a pair of middle supports 26, a plurality of a pair of wheels 28, an inverted U-shaped telescopic handle 30, a grip portion 32, an activation control 34, and a pair of handle adjustment controls 36. The car seat 20 has a seat portion 38, a rearwardly inclined back portion 40, a front portion 42, a pair of V-shaped side portions 44 comprising a right side portion 46 and a left side portion 48, and a base 50 having a bottom surface 52. The bottom surface 52 of the base 50 of the car seat 20 has a right side 54 and a left side 56. The support member 22 is disposed within the base 50 of the car seat 20. The pair of openings 24 includes a right opening 58 and a left opening 60. Each of the right opening 58 and the left opening 60 is disposed proximal the right side 54 and the left side 56, respectively, on the bottom surface 52 of the base 50 of the car seat 20, from proximal the back portion 40 of the car seat 20 to proximal the front portion 42 of the car seat 20. The pair of middle supports 26 includes a right middle support 62 and a left middle support 64. Each of the right middle support 62 and the left middle support 64 has a top surface 66 and a front surface 68. The right middle support 62 and the left middle support 64 are substantially medially disposed within the right side portion 46 and the left side portion 48, respectively.

Figure 5:
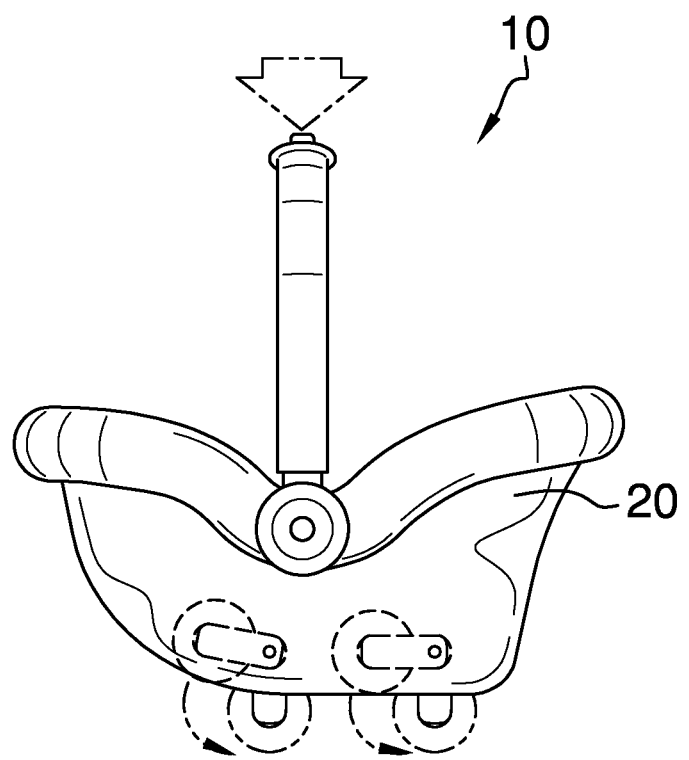
FIG. 5 is a side elevation view showing a plurality of a pair of wheels in a retracted position and an alternate extended position.

The plurality of a pair of wheels 28 includes a front pair of wheels 70 and a rear pair of wheels 72. Each of the front pair of wheels 70 and the rear pair of wheels 72 has a right wheel 74 colinearly disposed with a left wheel 76. The front pair of wheels 70 and the rear pair of wheels 72 are pivotally attached to the support member 22. As best shown in FIG. 5, the plurality of a pair of wheels 28 has a retracted position and an alternate extended position. The plurality of a pair of wheels 28 is in the retracted position when the right wheel 74 of each of the front pair of wheels 70 and the rear pair of wheels 72 is fully disposed within the right opening 58, and the left wheel 76 of each of the front pair of wheels 70 and the rear pair of wheels 72 is fully disposed within the left opening 60. The plurality of a pair of wheels 28 is in the extended position when each of the front pair of wheels 70 and the rear pair of wheels 72 is fully disposed outside the base 50 of the car seat 20 underneath the bottom surface 52 of the base 50.

The inverted U-shaped telescopic handle 30 has a right edge 78, a left edge 80, and a middle portion 82. Each of the right edge 78 and the left edge 80 is pivotally attached to the top surface 66 of each of the right middle support 62 and the left middle support 64, respectively. As best shown in FIG. 3, the handle 30 has an elongated position and an alternate abbreviated position. The handle 30 is in the elongated position when the handle 30 is fully extended. The handle 30 is in the abbreviated position when the handle 30 is fully retracted. The grip portion 32 is continuously medially disposed around a perimeter of the middle portion 82 of the handle 30.

The activation control 34 is disposed on a top side 84 of the grip portion 32. The pair of handle adjustment controls 36 includes a right handle adjustment control 86 and a left handle adjustment control 88. Each of the right handle adjustment control 86 and the left handle adjustment control 88 is disposed on the front surface 68 of each of the right middle support 62 and the left middle support 64, respectively.

What is claimed is:

1. A convertible car seat and stroller comprising:
    a car seat having a seat portion, a rearwardly inclined back portion, a front portion, a pair of V-shaped side portions comprising a right side portion and a left side portion, and a base having a bottom surface, the base bottom surface having a right side and a left side;
    a support member disposed within the car seat base;
    a pair of openings comprising a right opening and a left opening, each of the right opening and the left opening is disposed proximal the right side and the left side, respectively, on the bottom surface of the car seat base from proximal the car seat back portion to proximal the car seat front portion;
    a pair of middle supports comprising a right middle support and a left middle support, each of the right middle support and the left middle support having a top surface and a front surface, wherein the right middle support and the left middle support are substantially medially disposed within the right side portion and the left side portion, respectively;
    a plurality of a pair of wheels comprising a front pair of wheels and a rear pair of wheels, each of the front pair of wheels and the rear pair of wheels having a right wheel colinearly disposed with a left wheel, wherein the front pair of wheels and the rear pair of wheels are pivotally attached to the support member;
    wherein the plurality of a pair of wheels has a retracted position and an alternate extended position;
    wherein the plurality of a pair of wheels is in the retracted position when the right wheel of each of the front pair of wheels and the rear pair of wheels is fully disposed within the right opening, and the left wheel of each of the front pair of wheels and the rear pair of wheels is fully disposed within the left opening;
    wherein the plurality of a pair of wheels is in the extended position when each of the front pair of wheels and the rear pair of wheels is fully disposed outside the car seat base underneath the bottom surface of the car seat base;
    an inverted U-shaped telescopic handle having a right edge, a left edge, and a middle portion, each of the right edge and the left edge pivotally attached to the top surface of each of the right middle support and the left middle support, respectively;
    wherein the handle has an elongated position and an alternate abbreviated position;
    wherein the handle is in the elongated position when the handle is fully extended;
    wherein the handle is in the abbreviated position when the handle is fully retracted;
    a grip portion continuously medially disposed around a perimeter of the handle middle portion;
    an activation control disposed on a top side of the grip portion;
    wherein the activation control is configured to simultaneously transition the handle and the plurality of a pair of wheels between the elongated position and the extended position, respectively, and the abbreviated position and the retracted position, respectively; and
    a pair of handle adjustment controls comprising a right handle adjustment control and a left handle adjustment control, wherein each of the right handle adjustment control and the left handle adjustment control is disposed on the front surface of each of the right middle support and the left middle support, respectively;
    wherein each of the right handle adjustment control and the left handle adjustment control is configured to pivotally rotate the handle toward the car seat front portion and alternately toward the car seat back portion.

2. The convertible car seat and stroller of claim 1 wherein the grip portion is rubberized.

3. The convertible car seat and stroller of claim 1 wherein each of the right middle support and the left middle support is substantially cylindrical.

4. A convertible car seat and stroller comprising:
    a car seat having a seat portion, a rearwardly inclined back portion, a front portion, a pair of V-shaped side portions comprising a right side portion and a left side portion, and a base having a bottom surface, the base bottom surface having a right side and a left side;

a support member disposed within the car seat base;

a pair of openings comprising a right opening and a left opening, each of the right opening and the left opening is disposed proximal the right side and the left side, respectively, on the bottom surface of the car seat base from proximal the car seat back portion to proximal the car seat front portion;

a pair of middle supports comprising a right middle support and a left middle support, each of the right middle support and the left middle support having a top surface and a front surface, wherein the right middle support and the left middle support are substantially medially disposed within the right side portion and the left side portion, respectively;

wherein each of the right middle support and the left middle support is substantially cylindrical;

a plurality of a pair of wheels comprising a front pair of wheels and a rear pair of wheels, each of the front pair of wheels and the rear pair of wheels having a right wheel colinearly disposed with a left wheel, wherein the front pair of wheels and the rear pair of wheels are pivotally attached to the support member;

wherein the plurality of a pair of wheels has a retracted position and an alternate extended position;

wherein the plurality of a pair of wheels is in the retracted position when the right wheel of each of the front pair of wheels and the rear pair of wheels is fully disposed within the right opening, and the left wheel of each of the front pair of wheels and the rear pair of wheels is fully disposed within the left opening;

wherein the plurality of a pair of wheels is in the extended position when each of the front pair of wheels and the rear pair of wheels is fully disposed outside the car seat base underneath the bottom surface of the car seat base;

an inverted U-shaped telescopic handle having a right edge, a left edge, and a middle portion, each of the right edge and the left edge pivotally attached to the top surface of each of the right middle support and the left middle support, respectively;

wherein the handle has an elongated position and an alternate abbreviated position;

wherein the handle is in the elongated position when the handle is fully extended;

wherein the handle is in the abbreviated position when the handle is fully retracted;

a grip portion continuously medially disposed around a perimeter of the handle middle portion;

wherein the grip portion is rubberized;

an activation control disposed on a top side of the grip portion;

wherein the activation control is configured to simultaneously transition the handle and the plurality of a pair of wheels between the elongated position and the extended position, respectively, and the abbreviated position and the retracted position, respectively; and a pair of handle adjustment controls comprising a right handle adjustment control and a left handle adjustment control, wherein each of the right handle adjustment control and the left handle adjustment control is disposed on the front surface of each of the right middle support and the left middle support, respectively;

wherein each of the right handle adjustment control and the left handle adjustment control is configured to pivotally rotate the handle toward the car seat front portion and alternately toward the car seat back portion.

* * * * *